US009378352B2

(12) United States Patent
Prakash et al.

(10) Patent No.: US 9,378,352 B2
(45) Date of Patent: Jun. 28, 2016

(54) BARCODE AUTHENTICATION FOR RESOURCE REQUESTS

(71) Applicant: Intel Corporation, Santa Clara, CA (US)

(72) Inventors: Gyan Prakash, Portland, OR (US); Venkatesh Ramamurthy, Hillsboro, OR (US); Hong Li, El Dorado Hills, CA (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 13/763,116

(22) Filed: Feb. 8, 2013

(65) Prior Publication Data

US 2014/0230039 A1   Aug. 14, 2014

(51) Int. Cl.
*G06F 21/35* (2013.01)
*G06F 21/36* (2013.01)
*H04L 29/06* (2006.01)
*H04W 12/06* (2009.01)

(52) U.S. Cl.
CPC ............... *G06F 21/35* (2013.01); *G06F 21/36* (2013.01); *H04L 63/0853* (2013.01); *H04W 12/06* (2013.01); *H04L 2463/082* (2013.01)

(58) Field of Classification Search
CPC ....... G06F 21/335; G06F 21/31; G06F 21/36; G06F 2221/2119; G06F 2221/2153; G06K 19/06037; G06K 7/1417; G06K 19/06028; H04L 2463/082
USPC .................. 726/3, 5, 9; 713/189; 235/472.01, 235/462.25, 462.01, 462.14, 462.32
See application file for complete search history.

(56) References Cited

U.S. PATENT DOCUMENTS

| 6,550,685 | B1 * | 4/2003 | Kindberg ......... G06K 19/06028 235/462.01 |
| 2003/0141368 | A1 * | 7/2003 | Pascual et al. ........... 235/462.07 |
| 2004/0003250 | A1 * | 1/2004 | Kindberg et al. ............. 713/171 |
| 2006/0183462 | A1 * | 8/2006 | Kolehmainen ................ 455/411 |
| 2009/0101708 | A1 | 4/2009 | Kochevar et al. |
| 2009/0222353 | A1 * | 9/2009 | Guest et al. ..................... 705/17 |
| 2009/0245521 | A1 * | 10/2009 | Vembu et al. ................. 380/279 |

(Continued)

FOREIGN PATENT DOCUMENTS

EP       2224665 A1     9/2010

OTHER PUBLICATIONS

International Search Report and Written Opinion mailed Jun. 2, 2014 for International Application No. PCT/US2014/011333, 13 pages.

(Continued)

*Primary Examiner* — Alexander Lagor
(74) *Attorney, Agent, or Firm* — Schwabe, Williamson & Wyatt, P.C.

(57) ABSTRACT

Mobile device, client device and server associated with client-server authentication are described. In embodiments, the mobile device may comprise a camera and a token extractor. The token extractor may be coupled to the camera and configured to analyze an image, captured by the camera. The captured image may contain a barcode and may be displayed on a client device in response to a request of a server for access to a resource. The barcode may contain a token, which may be extracted by the token extractor to be used to gain access to a resource requested from a server. Other embodiments may be described and/or claimed.

25 Claims, 6 Drawing Sheets

(56) References Cited

U.S. PATENT DOCUMENTS

| | | | |
|---|---|---|---|
| 2011/0219427 A1* | 9/2011 | Hito et al. | 726/3 |
| 2012/0036218 A1 | 2/2012 | Oh et al. | |
| 2012/0066392 A1 | 3/2012 | Brown et al. | |
| 2013/0055362 A1* | 2/2013 | Rathbun | 726/5 |
| 2013/0179692 A1* | 7/2013 | Tolba et al. | 713/179 |

OTHER PUBLICATIONS

International Preliminary Report on Patentability mailed Aug. 20, 2015 for International Application No. PCT/US2014/011333, 10 pages.

\* cited by examiner

BARCODE AUTHENTICATION FOR RESOURCE REQUESTS

TECHNICAL FIELD

Embodiments of the present disclosure are related to the field of data processing, and in particular, to the field of authentication of resource requests using a barcode.

BACKGROUND

Presently there are a number of methods utilized in authenticating a user requesting online resources. These methods range from those requiring relatively little security to those requiring additional layers of security.

One authentication method requiring relatively little security is represented by a challenge-response utilized for authenticating a user's presence. In challenge-response scenarios a user is presented with a challenge that is easy for a computer to generate but difficult for a computer to solve. One example of this is the commonly used CAPTCHA screen where a distorted image of a word or phrase is presented to a user as a challenge and the user is able to decipher the distorted image and respond, thereby verifying the user's presence. An issue with a challenge-response authentication, such as CAPTCHA, is that it is vulnerable to malware attacks.

An authentication method requiring additional layers of security is represented by multi-factor authentication. In multi-factor authentication a user is commonly authenticated utilizing both what the user knows, i.e. username and password, in addition to what the user has, i.e. an RSA secure ID fob. However, these authentication methods are capable of being compromised by man in the middle attacks (MITM). This method of authentication also suffers from the fact that the same algorithm residing on the RSA secure ID fob must also reside on an authentication server and both algorithms must act upon the same seed value to properly authenticate the user. This creates unnecessary redundancy and inefficiency. If this algorithm is compromised at either end then the algorithm on both devices must be changed.

DETAILED DESCRIPTION OF ILLUSTRATIVE EMBODIMENTS

Mobile device, client device and server associated with client-server authentication are described. In embodiments, the mobile device may comprise a camera and a token extractor. The token extractor may be coupled to the camera and configured to analyze an image, captured by the camera. The captured image may contain a barcode and may be displayed on a client device in response to a request of a server for access to a resource. The barcode may contain a token, which may be extracted by the token extractor to be used to gain access to a resource requested from a server. For example, the requested resource may be an application, the barcode may be a quick response (QR) code, and the mobile device may be a smartphone.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
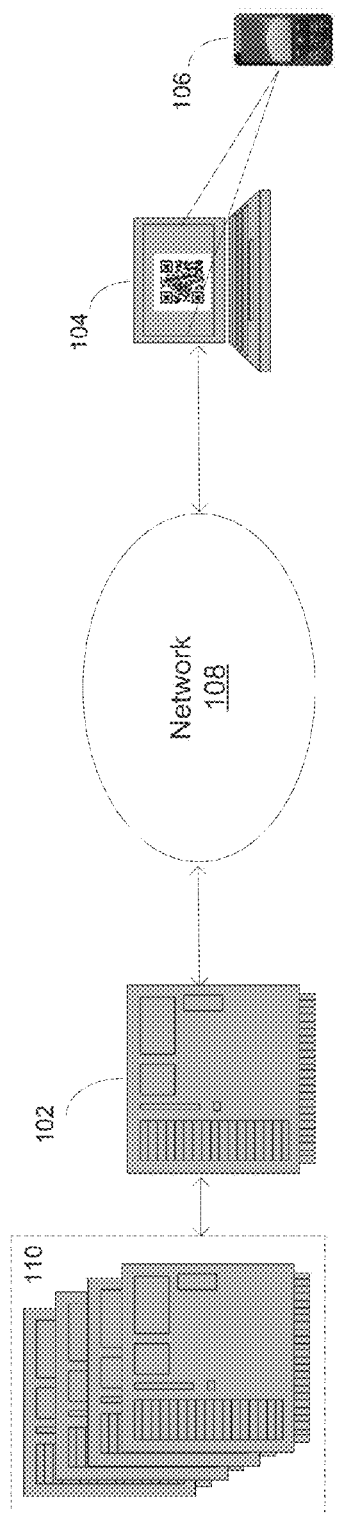
FIG. 1 depicts an illustrative computing system, according to some embodiments of the present disclosure.

FIG. 1 depicts an illustrative computing arrangement suitable for practicing embodiments of the present disclosure. As illustrated, the computing arrangement may be comprised of a server 102 connected via network 108 to client device 104. In embodiments, a user may use client device 104 to request a resource provided by or via server 102. In response to this request, server 102 may generate a barcode containing a token and transmit the barcode to the client device to be used for authentication. The client device may, upon receipt of the barcode, display the barcode to the user of the client device.

In embodiments, mobile device 106 may be used to decode data contained in the barcode, depicted in this figure as a QR code, displayed on client device 104 and output at least a portion of the decoded data, such as the token, to be used to enable access to the requested resource. In some embodiments, mobile device 106 may have been previously provisioned to decode the data contained in the barcode in a manner specific to mobile device 106, and server 102 may have encoded the barcode in a corresponding manner. In some embodiments, server 102 may be passed either a device and/or user identifier in the request for the resource, identifying e.g., mobile device 106 and/or a user of mobile device 106. In some embodiments, a user identifier may be utilized by server 102 as a cross-reference to locate a device identifier in a table, database, or other similar repository stored either locally on server 102 or remotely on another server.

In some embodiments, the barcode may be encoded in a manner specific to mobile device 106 such that the decoding of the barcode itself may act as a measure of authenticating the user of mobile device 106 as having authorization to access the requested resource. For example, in some embodiments, if the requested resource requires multi-factor authentication, a password input by the user may be one factor of the authentication while decoding the barcode by mobile device 106 to extract the token and inputting that token into client device 104 may be a subsequent factor in the authentication. In this example, an unauthorized user or a malicious computer program will not be able to extract the information needed for secondary authentication, even if the unauthorized user or a malicious computer program is able to capture the barcode displayed on the client device.

In some embodiments, the mobile device specific encoding may be utilized in place of a username and password. For example, in some embodiments, the user may have previously set a login policy with the requested resource such that all that may be needed to access the requested resource is the token contained in the barcode. In some embodiments, the specific encoding may be used in instances where a user has forgotten the password to a requested resource. In these instances the token may be used to gain access to the requested resource and/or initiate a password change. Additionally, in some embodiments, the mobile device specific encoding may be utilized to generate a one-time-password (OTP) so that the authorized user need not memorize a static password, and an unauthorized user or malicious computer program cannot access the resource by trying to break the password, for example through a brute force attack.

In some embodiments, it may not be necessary to encode the barcode in a manner specific to mobile device 106. For example, in some embodiments, if the requested resource requires only user presence authentication the barcode may be generically encoded by server 102 such that mobile device 106 may be able to decode the barcode without prior provisioning. In these embodiments the act of decoding the barcode by mobile device 106 to extract the token may be sufficient to authenticate the presence of a user once the token is input into client device 104.

In some embodiments, the barcode may be encoded in a manner specific to the requested resource. In such embodiments, mobile device 106 may be provisioned to decode the barcode for the requested resource. In some embodiments, provisioning the device to decode the barcode based on the requested resource may be performed by registering mobile device 106 with the requested resource prior to attempting to decode the barcode. For example, in some embodiments, the user may register mobile device 106 by connecting to a server, such as server 102, using mobile device 106. In response to the connection, server 102 may install a decoding algorithm on mobile device 106 to be used at a later date to decode a barcode displayed by client device 104 on behalf of the requested resource.

In some embodiments it may not be necessary to register mobile device 106 to enable decoding of a barcode associated with gaining access to a resource. In some embodiments, mobile device 106 may be provisioned by installing the appropriate decoding algorithm or key utilizing any manner of computer-readable media as a delivery mechanism.

In some embodiments, the barcode may be encoded in a manner specific to both mobile device 106 and the requested resource. In some embodiments, the barcode may be encoded in a manner identified by utilizing both the identifier of the requested resource and the identifier of the user and/or mobile device 106 to arrive at a unique identifier to use in the encoding method. In some embodiments, as discussed above, mobile device 106 may be provisioned prior to decoding the barcode to enable mobile device 106 to decode such a barcode.

Mobile device 106 may, according to some embodiments, accept input from the user to identify which requested resource a barcode has been encoded for. For example, in some embodiments, the user may be presented with a list of resource algorithms or keys that have been provisioned on mobile device 106. From this list the user may select the resource associated with the request, thus selecting the appropriate algorithm or key with which to decode the barcode. In some embodiments, the identity of the requested resource may be encoded in a portion of the barcode such that this portion may be able to be decoded without knowledge of the requested resource. In these instances, the decoded identity of the resource may be utilized to identify the appropriate algorithm to decode the remainder of the barcode and extract the token, which may then be input into client device 104 to be used for authentication.

In embodiments, the requested resource may be provided by server 102. In other embodiments, server 102 may act as an intermediary and route the resource request on to one or more other servers, such as resource servers 110, to fulfill the resource request. In some embodiments, server 102 may perform the required authentication whether or not server 102 may provide the requested resource. In other embodiments, the authentication may be performed by one of the resource servers 110 that may provide the requested resource.

In some embodiments, the requested resource may be a secure connection between client device 104 and server 102. In these instances the token may be comprised of an encryption key. The encryption key may be decoded, as discussed above, by mobile device 106 and input into client device 104 to be utilized by client device 104 in sending and receiving encrypted transmissions to and from server 102 over network 108. In these instances, the input of the extracted token and transmission of a message properly encrypted with that token may act as a sufficient authentication mechanism. In some embodiments the token may be a Diffie-Hellman encryption key.

In some embodiments, the extracted token may be input into client device 104 by displaying the extracted token in an alphanumeric format such that the user of the mobile device 106 may manually enter the token into client device 104. In other embodiments the token may be transmitted to client device 104 by way of a wireless data connection. This wireless data connection may, in some embodiments, include, but is not limited to, Bluetooth, wireless USB, or a near field communication (NFC) channel, or other wireless data connection.

While client device 104 is depicted in FIG. 1 as a laptop computer, it will be appreciated that any suitable computing device capable of performing the functions of client device 104 may be used without departing from the scope of the present disclosure. It will be appreciated then that client device 104 may be any portable or non-portable computing device such as, but not limited to, a laptop computer, desktop computer, a hand-held computing device, a public portal such as a kiosk, a terminal, such as that used in a checkout line for accepting credit card payments, or any other device capable of displaying a login screen or barcode such as that depicted in FIG. 8.

Network 108 may be any type of wired or wireless network, including, but not limited to, local area networks (LANs), wide area networks (WANs), cellular networks, and the internet. Any network suitable for transmitting the requisite data may be used without departing from the scope of this disclosure. It will also be appreciated that network 108 may comprise one or more wired and/or wireless networks without departing from the scope of this disclosure. This disclosure is equally applicable regardless of type and/or composition of the network.

Figure 2:
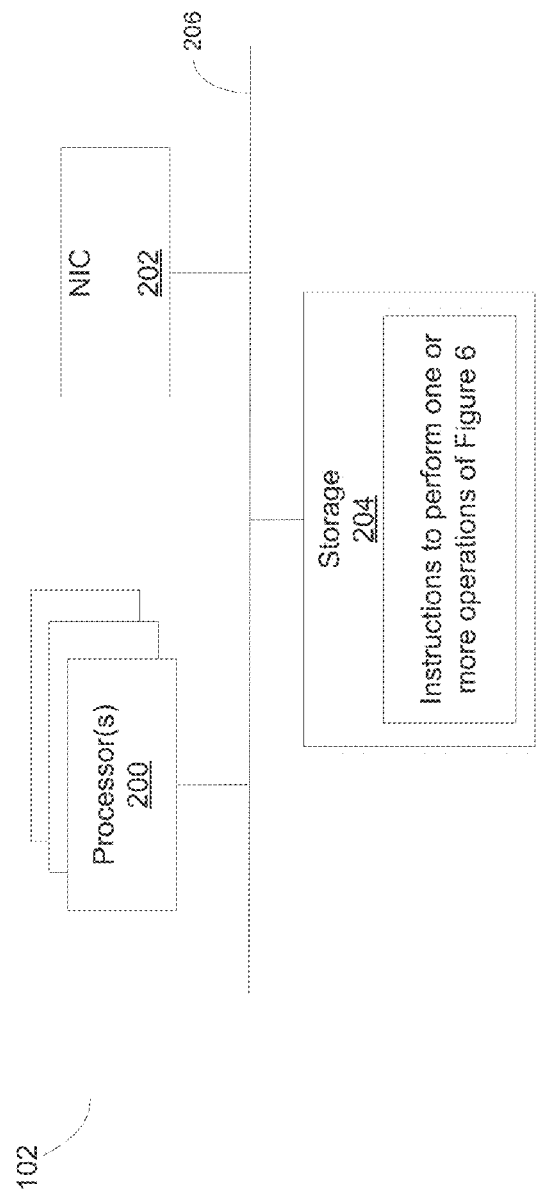
FIG. 2 is a diagram of an illustrative configuration of a server in the computing system of FIG. 1, according to some embodiments of the present disclosure.

FIG. 2 depicts an illustrative configuration of server 102 according to some embodiments of the disclosure. Server 102 may comprise processor(s) 200, network interface card(s) (NIC) 202 and storage 204. Processor(s) 200, NIC 202 and Storage 204 may all be coupled together utilizing system bus 206.

Processor(s) 200 may, in some embodiments, be a single processor or, in other embodiments, may be comprised of multiple processors. In some embodiments the multiple processors may be of the same type, i.e. homogeneous, or they may be of differing types, i.e. heterogenous and may be include any type of single or multi-core processors. This disclosure is equally applicable regardless of type and/or number of processors.

In embodiments, NIC 202 may be used by server 102 to access network 108. In embodiments, NIC 202 may be used to receive or respond to requests from client device 104. In embodiments, NIC 202 may be used to access a wired or wireless network; this disclosure is equally applicable. NIC 202 may also be referred to herein as a network adapter, LAN adapter, or wireless NIC which may be considered synonymous for purposes of this disclosure, unless the context clearly indicates otherwise; and thus, the terms may be used interchangeably.

In embodiments, storage 204 may be any type of computer-readable storage medium or any combination of differing types of computer-readable storage media. For example, in embodiments, storage 204 may include, but is not limited to, a solid state drive (SSD), a magnetic or optical disk hard drive, volatile or non-volatile, dynamic or static random access memory, flash memory, or any multiple or combination thereof. In embodiments, storage 204 may store instructions which, when executed by processor(s) 200, cause server 102 to perform one or more operations of the process described in reference to FIG. 6, below. In some embodiments, storage 204, may contain a database of records such as a table cross-referencing a user identifier with an appropriate mobile device identifier.

Figure 3:
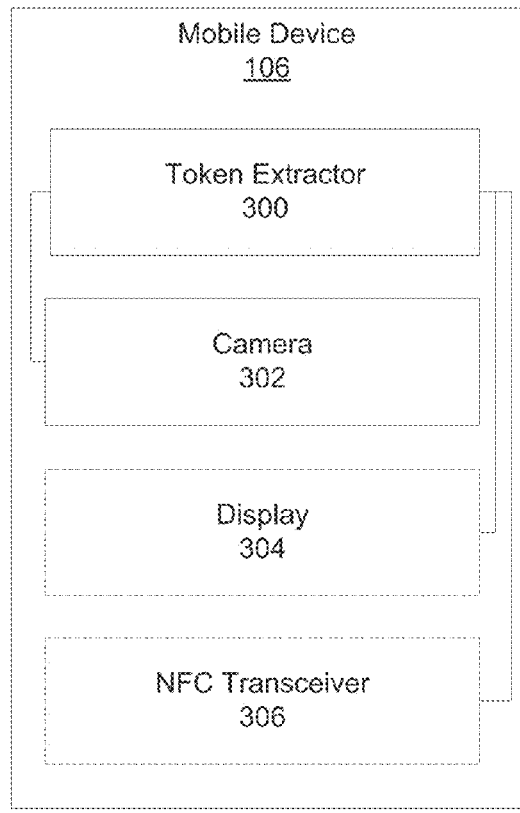
FIG. 3 is a diagram of one possible configuration of a mobile device in the computing system of FIG. 1, according to some embodiments of the present disclosure.

FIG. 3 depicts one possible configuration of mobile device 106 in the computing system of FIG. 1, according to some embodiments of the present disclosure. Mobile device 106 may be comprised of token extractor 300 coupled to camera 302. In some embodiments, mobile device 106 may also include display 304 and/or near field communication (NFC) transceiver 306, either, or both, of which may also be coupled to token extractor 300.

Token extractor 300 may, in some embodiments, comprise one or more processors coupled to one or more computer-readable storage media. The one or more computer-readable storage media may contain instructions which, when executed by the one or more processors, may cause the mobile device 106 to perform one or more of the processes described in reference to FIG. 7, below. In other embodiments, token extractor 300 may be composed of any number of hardware and/or software components that cause the mobile device 106 to perform one or more processes described in reference to FIG. 7, below.

The one or more processors may be any type of single or multi-core processor, or any combination thereof. This disclosure is equally applicable regardless of type and/or number of processors. Camera 302, display 304, and/or NFC transceiver 306 may all be contained in mobile device 106, or one or more of these components may be peripherally attached to mobile device 106 without departing from the scope of the present disclosure.

Figure 4:
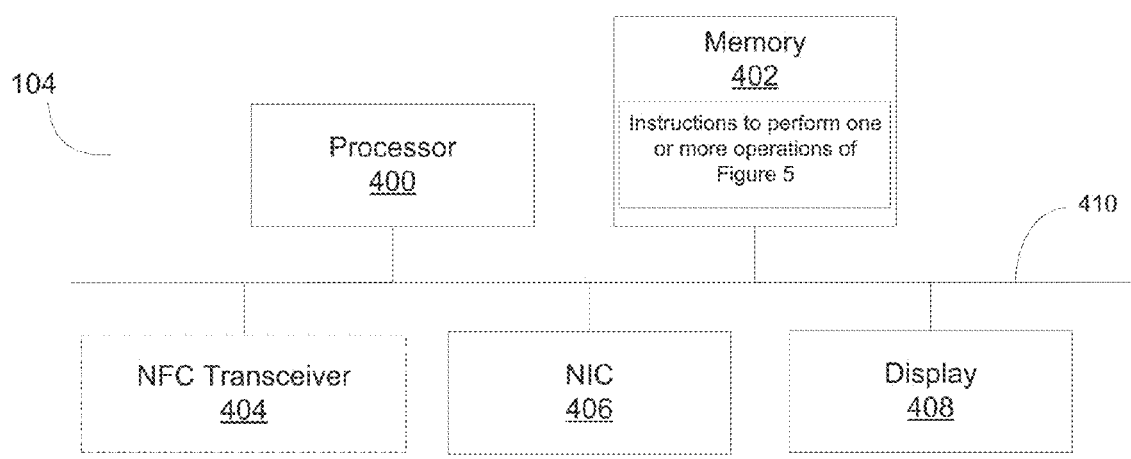
FIG. 4 is a diagram of one possible configuration of a client device in the computing system of FIG. 1, according to some embodiments of the present disclosure.

FIG. 4 depicts one possible configuration of client device 104 in the computing system of FIG. 1, according to some embodiments of the present disclosure. Client device 104 may be comprised of one or more processors 400, memory 402, a network interface card (NIC) 406, and a display 408. In some embodiments, mobile device 106 may also include near field communication (NFC) transceiver 404. All of these components may be coupled together through bus 410.

In embodiments with more than one processor, the processors may be of the same type, i.e. homogeneous, or they may be of differing types, i.e. heterogenous. In addition, the one or more processors may be any type of single or multi-core processors. This disclosure is equally applicable regardless of type and/or number of processors.

In embodiments, NIC 402 may be used by client device 104 to access network 108. In embodiments, NIC 402 may be used to send requests and/or receive responses from server 102. In embodiments, NIC 402 may be used to access a wired or wireless network, this disclosure is equally applicable and this disclosure is not to be so limited. NIC 402 may also be referred to herein as a network adapter, LAN adapter, or wireless NIC which may be considered synonymous, for purposes of this disclosure, unless the context clearly indicates otherwise. Therefore, these terms may be used interchangeably.

In embodiments, memory 402 may be any type of computer-readable storage medium or any combination of differing types of computer-readable storage media. For example, in embodiments, memory 402 may include, but is not limited to, a solid state drive (SSD), a magnetic disk hard drive, volatile or non-volatile, dynamic or static random access memory, flash memory, or any multiple or combination thereof. In embodiments, memory 402 may store instructions which, when executed by processor 400, may cause client device 104 to perform one or more operations of the process described in reference to FIG. 5 below.

Figure 5:
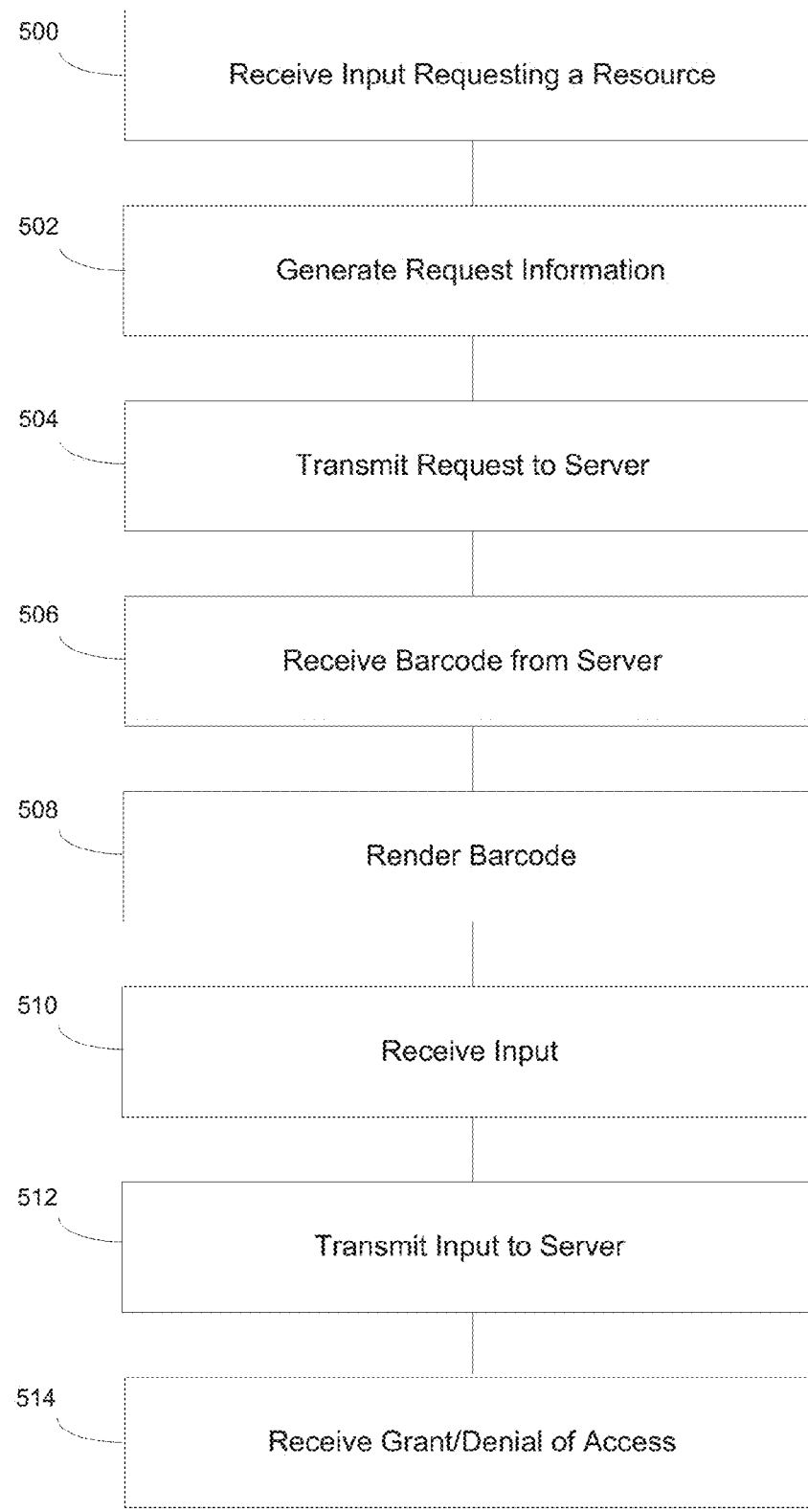
FIG. 5 is a flow chart of an illustrative resource request of a client device, according to some embodiments of the present disclosure.

FIG. 5 depicts a flow chart of an illustrative resource request of client device 104, according to some embodiments of the present disclosure. In embodiments, the process may begin at block 500 where client device 104 may receive input requesting a resource. In some embodiments, this input may be received from a user. In other embodiments, this input may be received from an application requesting access to the resource. In embodiments, the resource requested may include, but is not limited to, an application, website, web service or secure data connection.

In block 502 client device 104 may generate information to transmit in making the resource request of server 102. This may include, in some embodiments, extracting an identifier of the requested resource, such as a uniform resource locator (URL), an IP address, or the like from the input received in block 500. In some embodiments, this may include extracting a user and/or mobile device identifier from the input received in block 500. In other embodiments, client device 104 may retrieve the identifier of the user and/or mobile device 106 from memory 402. In some embodiments, client device 104 may prompt a user for a user and/or mobile device identifier.

As an example, in some embodiments, when client device 104 receives input requesting a resource, client device 104 may attempt to retrieve an identifier of a user and/or mobile device from a cookie stored in memory 402 of client device 104. If an identifier of a user and/or mobile device cannot be retrieved, i.e. an appropriate cookie has not been stored in memory 402, a user may be prompted to input an appropriate identifier of the user and/or a mobile device.

In block 504, the resource request may be forwarded to server 102 with an identifier of the requested resource. In embodiments, the resource request forwarded to server 102 may also include an identifier of a user and/or a mobile device. In some embodiments, server 102 may require an identifier of a user and/or mobile device for the requested resource and server 102 may send a request to client device 104 requesting an identifier of a user and/or mobile device to client device 104 if such an identifier is not included in the request, or otherwise available to server 102.

In block 506, client device 104 may receive a barcode, such as a QR code, from server 102. In some embodiments, the barcode may be embedded in a login screen, such as that depicted in FIG. 8. In some embodiments, the barcode may be received separate from any other data transmitted by server 102. As discussed above in reference to FIG. 1, the encoding of the barcode may, in some embodiments, be dependent upon the requested resource and/or the identifier of the user and/or mobile device.

In block 508 client device 104 may render the barcode on display 408. In some embodiments, client device 104 may render the barcode utilizing a secure display channel, including, but not limited to Intel's protected audio video path (PAVP). The user may then utilize mobile device 106 to decode the barcode and extract the token as discussed above in reference to FIG. 1.

Once the barcode has been decoded and the token extracted, mobile device 106 may output the extracted token to client device 104. In block 510 client device 104 may receive the token as input. As discussed above in reference to FIG. 1, the token may be manually entered into client device 104 or it may be transmitted through a wired or wireless data connection between mobile device 106 and client device 104. Client device 104 may then transmit the input token to server 102 in block 512. Subsequently, server 102 may authenticate the resource request based, at least in part, upon the extracted token. Subsequently, in block 514, client device 104 may receive a grant or denial of access to the requested resource depending on the success of the authentication.

Figure 6:
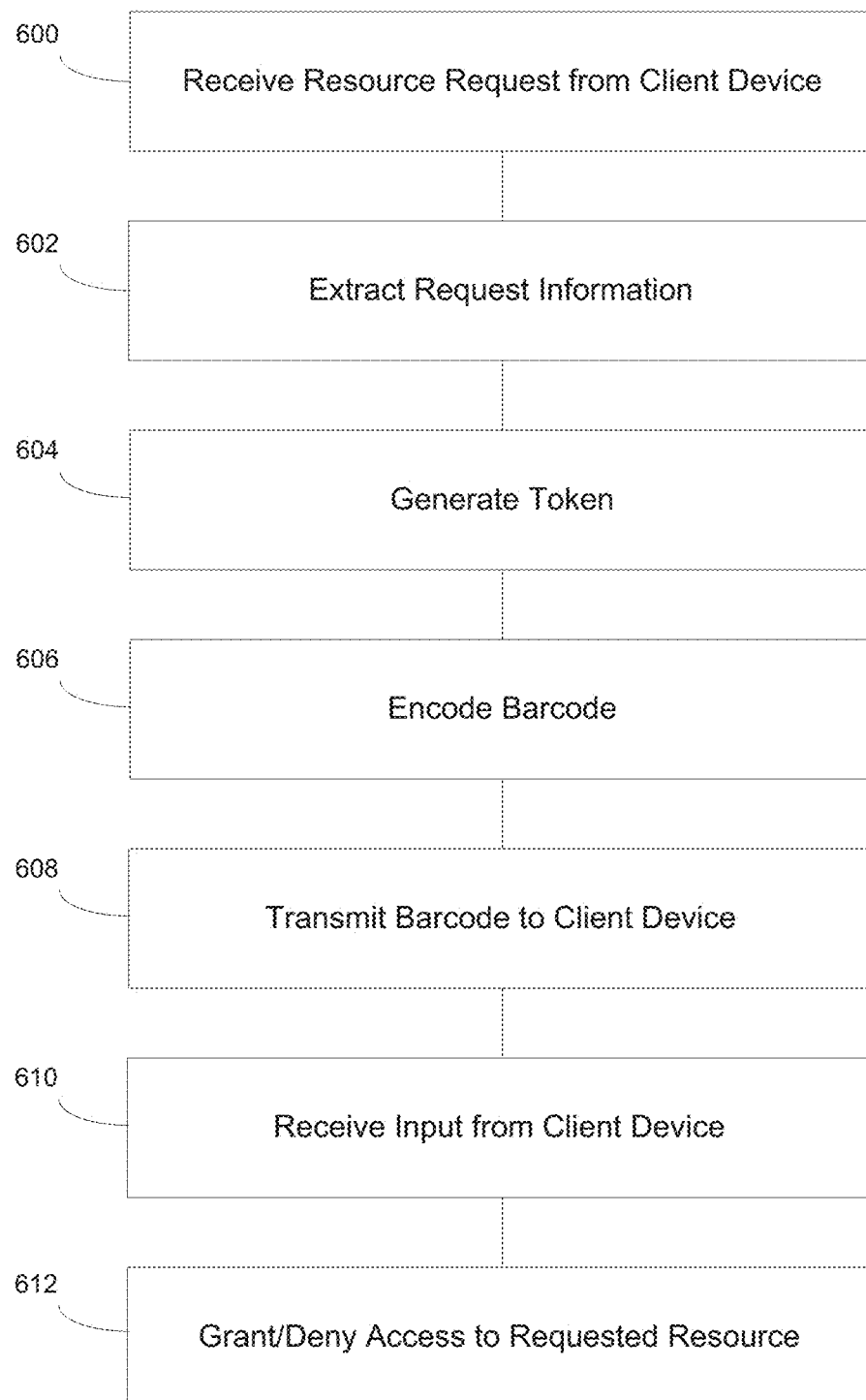
FIG. 6 is a flow chart of an illustrative resource request of a server, according to some embodiments of the present disclosure.

FIG. 6 is a flow chart of an illustrative resource request of server 102, according to some embodiments of the present disclosure. In embodiments, the process may begin at block 600 where server 102 may receive a request for a resource from a client device 104, such as that transmitted by client device 104 in block 504 of FIG. 5. In embodiments, this request may include an identifier of the requested resource. In some embodiments this request may also include an identifier of a user and/or mobile device.

In block 602, server 102 may extract the resource identifier from the received request. In some embodiments, server 102 may also extract an identifier of a user and/or mobile device where such an identifier has been included with the request. Server 102 may generate a token in block 604. In some embodiments, the token may only be valid for a predetermined amount of time and/or a single use. In block 606 the token may be encoded into a barcode. The barcode may be encoded in any format and may be any type of 1 or 2 dimensional barcode, including, but not limited, a QR code. As discussed above in reference to FIG. 1 the barcode may be encoded in a generic manner, or may be encoded in a manner specific to the requested resource and/or mobile device 106. In some embodiments, the barcode may be signed by the server to verify server 102 to mobile device 106.

The barcode may then be transmitted to client device 104, at block 608, where it may be displayed to the user of client device 104. The user then decodes the barcode utilizing mobile device 106 which extracts the token from the barcode and outputs the token to be input to the client device 104 and sent to server 102 in block 610 for authentication. Based upon the success of the authentication, server 102 may then, in block 612, grant or deny access to the requested resource. In some embodiments, as discussed above, mobile device 106 may be specially provisioned to decode the barcode and only such specially provisioned mobile devices are capable of decoding the barcode.

Figure 7:
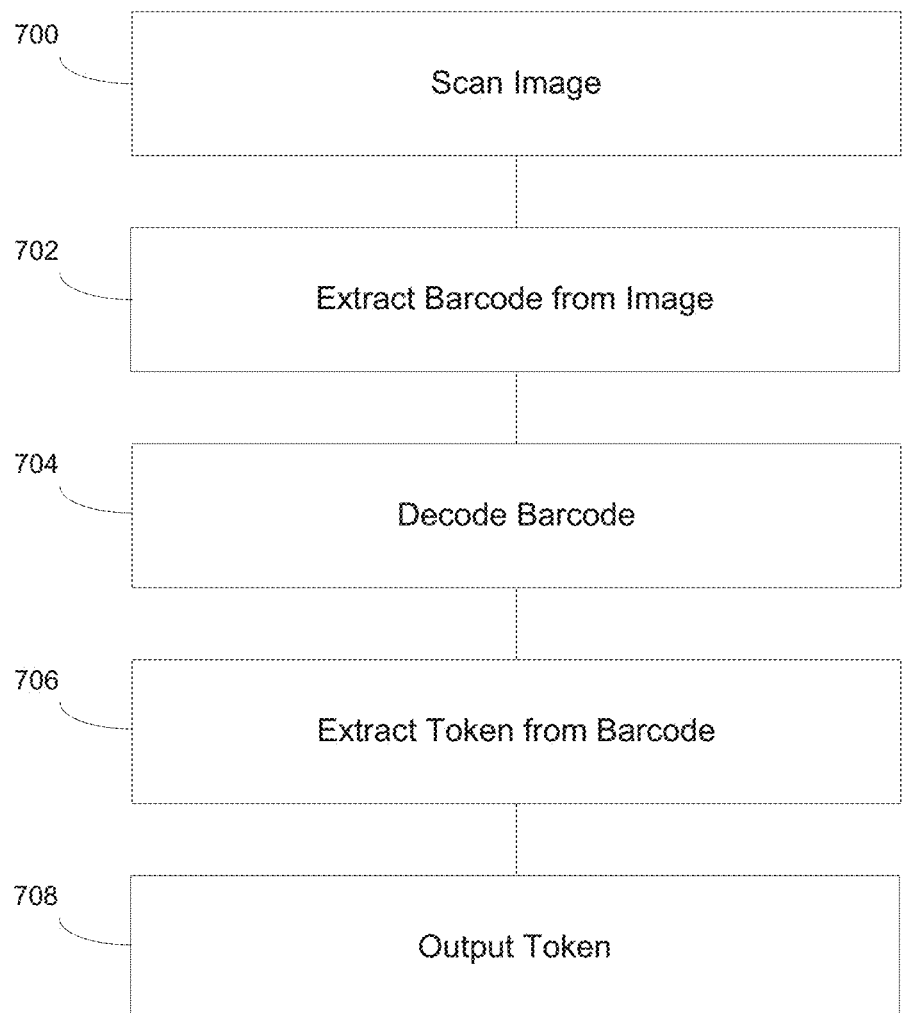
FIG. 7 is a flow chart of an illustrative token extraction on a mobile device, according to some embodiments of the present disclosure.

FIG. 7 depicts an illustrative process flow of a token extraction on mobile device 106, according to some embodiments of the present disclosure. The process may begin in block 700 wherein an image displayed on client device 104 may be scanned. A barcode may then be extracted from the scanned image at block 702. Mobile device 106 may then decode the barcode in block 704. In some embodiments, a password or personal identification number (PIN) may be required by mobile device 106 before decoding the barcode. As discussed above in reference to FIG. 1, this decoding may be generic or may be specific to the mobile device and/or the resource. In block 706, mobile device 106 may then extract the token from the decoded barcode. In some embodiments, the token may be extracted by parsing the decoded data. The token may then be output by mobile device 106. In some embodiments the token may be output by displaying the token in an alphanumeric format such that it may be manually entered by the user into client device 104. In some embodiments, the token may be output via a wired or wireless data connection between mobile device 106 and client device 104. In embodiments where the decoding may be specific to mobile device 106, an unauthorized user/device or a malicious computer program would not be able to extract the information needed for secondary authentication. This is because, even if an unauthorized user/device or malicious computer program is able to capture the barcode displayed on client device 104 it would not have been provisioned to be able to decode the barcode as discussed above in reference to FIG. 1.

Figure 8:
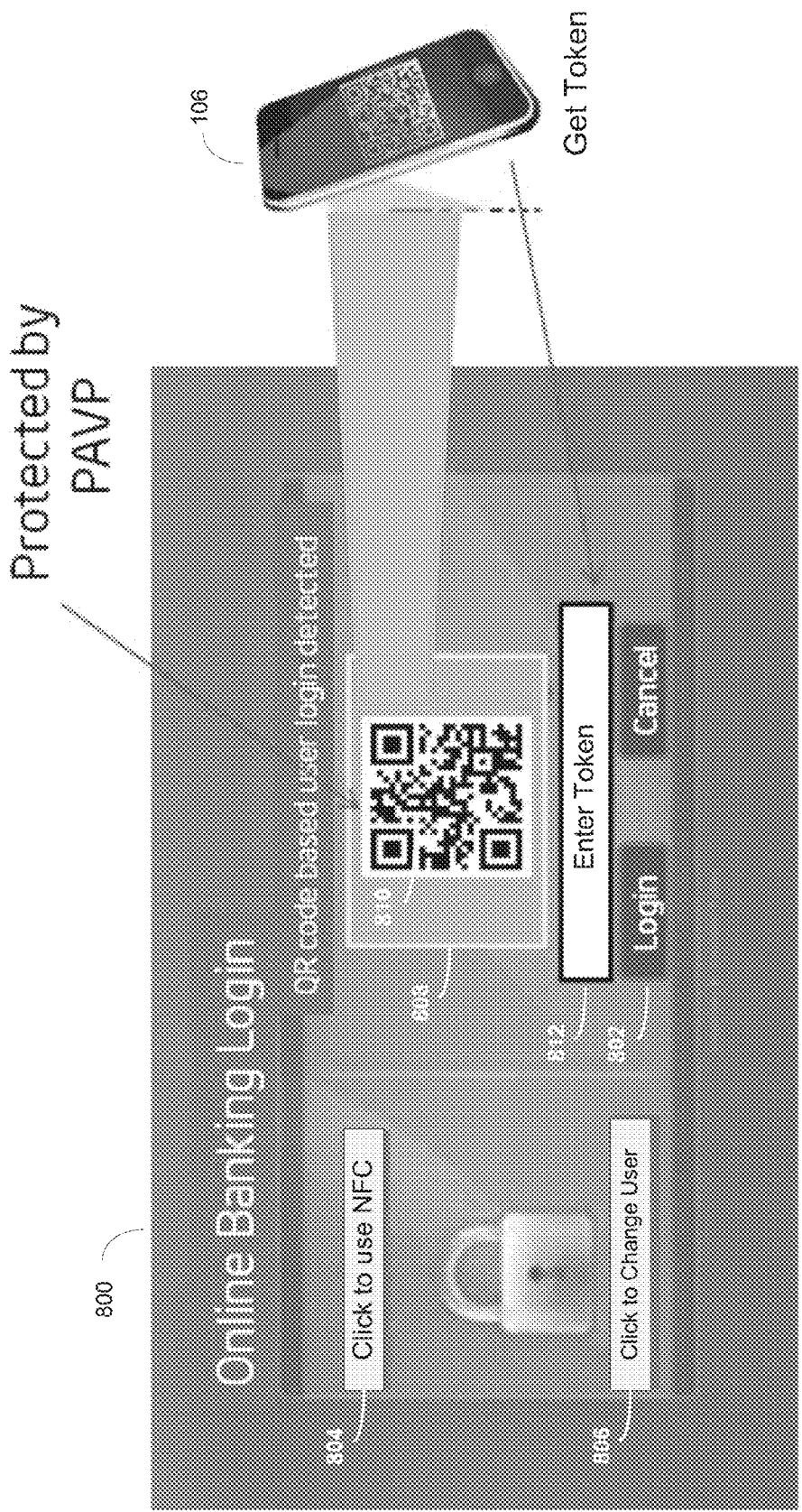
FIG. 8 depicts an illustrative login screen according to some embodiments of the present disclosure.

FIG. 8 depicts an illustrative login screen 800 according to some embodiments of the present disclosure. In some embodiments, login screen 800 may be generated at server 102 and may be displayed on client device 104. In some embodiments, barcode 810 may be displayed in a display section 808 utilizing Intel's protected audio video path (PAVP), ARM Limited Corporation's TrusEone®, or another form of graphics processing unit content protection (GPU-CP). In some embodiments, barcode 810 may be displayed to a user who may use mobile device 106 to decode the barcode and extract a token from the decoded barcode. The user, in some embodiments, may enter the extracted token into token entry box 812. In some embodiments, the user may instead choose to input the extracted token by clicking on NFC button 804 to utilize a near field communication (NFC) data connection to input the extracted token. In other embodiments the user may merely need to tap mobile device 106 with a portion of client device to transfer the token via NFC. In some embodiments the user and/or mobile device identifier may be contained in a cookie of a web browser. In some embodiments the identifier in the cookie may not correspond to the current user of client device 104 and the user may need to input a new identifier corresponding to the current user and/or a mobile device by clicking on the change user button 806. After inputting the token into client device 104, the user may activate the login button 802 to submit the token to server 102 for authentication. Based upon the results of that authentication the user may be granted, or denied, access to the requested resource.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Thus, what has been described herein includes a mobile device, and at least one computer-readable storage medium. In embodiments, the mobile device may include a camera and a token extractor coupled with the camera. The token extractor may be configured to analyze an image captured by the camera from a display of a client device, and may extract a barcode from the image. The barcode may contain a token, and may be displayed on the client device in response to a request of the client device to access a resource. The token extractor may be further configured to extract the token contained in the barcode, and may enable the token to be used to gain the requested access to the resource.

In some embodiments, the mobile device may include a memory and a processor coupled to the memory and the camera. The token extractor may reside in the memory and may be executed by the processor. In some embodiments, the mobile device may also include an authentication module configured to authenticate a user prior to execution of the token extractor to enable the user to use the token to gain access to the requested resource.

In embodiments, the token extractor may be further configured to extract the token contained in the barcode via usage of an algorithm that is associated with the resource to decode the barcode to obtain data from the barcode. The token extractor may extract the token from the data.

In embodiments, the mobile device may also include a near field communication (NFC) transceiver coupled with the token extractor. The token extractor may be configured to transmit the token to the client device through the NFC transceiver to enable usage of the token to gain the requested access to the resource. In some embodiments, the token extractor may be configured to display the extracted token to enable usage of the token to gain access to the requested resource via a user entry of the token into the client device. In some embodiments the barcode may be a matrix barcode. In some embodiments the barcode may be a QR code. In some embodiments, the requested resource may be an application.

In embodiments, the at least one computer-readable storage medium may comprise instructions, which, when executed by a client device cause the client to transmit, to a server, a request for access to a resource. The request may include an identifier that identifies a mobile device. The instructions may, when executed by the client device, also cause the client device to render a response from the server on a display of the client device, to enable a token contained in a barcode in the response to be decoded. The token may then be transmitted back to the server to authenticate the client device. The barcode may be encoded based at least in part on the identifier identifying the mobile device as the decoding device. In some embodiments, the identifier is stored in the client device in the form of a cookie.

In embodiments, the instructions, when executed by the client device, may further enable the client device to accept, as input, the token, and transmit the token to the server. In embodiments, the instructions, when executed by the client device may further enable the client device to accept, as input, the token via a near field communication transceiver of the client device.

In embodiments, the instructions, when executed by the client device, further enable the client device to render the barcode on the display of the client device via a secure channel to the display, on the client device. In some embodiments, the secure channel may be a protected audio video path (PAVP).

In embodiments, the resource may be a secure data channel between the server and the client device. The token transmitted in the barcode may be a cryptographic key to be utilized by the client device to encrypt data transmitted to the server and decrypt data received from the server via the secure data channel. In some embodiments, the cryptographic key may be a Diffie-Hellman key.

In embodiments, the at least one computer-readable storage medium may comprise instructions, which, in response to execution by a server, configure the server to receive from a client device, a request to access a resource. The instructions may, in response to execution by the server, configure the server to generate, in response to the request, a barcode containing a token and transmit the barcode to the client device. The barcode may be displayed on the client device to enable the token to be extracted by a mobile device with a camera, and utilized to authenticate the user of the client device to the server, to enable the server to grant the requested access.

In embodiments, the instructions, when executed by the server, may configure the server to receive from the client device, a response, determine whether the response comprises the token, and grant or deny the requested access based at least in part on a result of the determination. In embodiments, the instructions to generate the barcode containing a token may further configure the server, upon execution of the instructions by the server, to encode, in a manner specific to the mobile device, the barcode with a token. In embodiments, the request may further include an identifier of the mobile device and the format specific to both the mobile device and the requested resource may be based, at least in part, upon the identifier.

In embodiments, the instructions, when executed by the server, further configure the server to generate a login page to access the requested resource. The login page may contain, at least, the barcode and to transmit the barcode to the client device further includes transmission of the login page to the client device in a format capable of being displayed to a user.

In some embodiments, the barcode may be a matrix barcode. In further embodiments, the barcode may be a QR code. In some embodiments, the requested resource may be an application. In some embodiments, the token is a one-time password (CTP).

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A mobile device comprising:
a camera; and
a token extractor coupled with the camera, the token extractor to:
analyze an image captured by the camera from a display of a client device separate from the mobile device;
extract a barcode from the image, wherein the barcode contains a token, and the barcode is displayed on the client device in response to a request of the client device to access an online resource;
decode an identity of the online resource from the barcode prior to extraction of the token;
based at least in part on the decoded identity of the online resource, select a barcode decoding algorithm associated with the online resource from a plurality of barcode decoding algorithms;
extract the token contained in the barcode, wherein extraction includes:
use the selected barcode decoding algorithm to decode the barcode to obtain data from the barcode; and
extract the token from the data; and
enable the token to be used to gain the requested access to the online resource by the client device.

2. The mobile device of claim 1, wherein the mobile device further comprises:
a memory; and
a processor coupled to the memory and the camera; and
wherein the token extractor resides in the memory and is executed by the processor.

3. The mobile device of claim 2, further comprising an authentication module to:
authenticate a user prior to execution of the token extractor to enable the user to use the token to gain the access to the requested online resource via the client device.

4. The mobile device of claim 1, further comprising a near field communication (NFC) transceiver coupled with the token extractor;
wherein the token extractor is to transmit the token to the client device through the NFC transceiver to enable usage of the token by the client device to gain the requested access to the online resource.

5. The mobile device of claim 1, wherein the token extractor is to display the extracted token to enable usage of the token to gain access to the requested online resource by the client device, via a user entry of the token into the client device.

6. The mobile device of claim 1, wherein the barcode is a matrix barcode.

7. The mobile device of claim 6, wherein the matrix barcode is a QR code.

8. The mobile device of claim 1, wherein the requested online resource is an online application hosted by a server.

9. At least one non-transitory computer-readable storage medium comprising instructions, which, in response to execution by a client device, cause the client device to:
transmit, to a server, a request for access to an online resource, wherein the request includes an identifier that identifies a mobile device, separate from the client device, as a decoding device;
render a response from the server on a display of the client device, to enable a token contained in a barcode in the response to be decoded and recovered from the barcode by the mobile device using a barcode decoding algorithm selected from a plurality of barcode decoding algorithms based on an identity of the online resource encoded in the barcode, and transmitted back to the server by the client device to authenticate the client device, wherein the barcode is encoded based at least in part on the identifier identifying the mobile device as the decoding device.

10. The at least one computer-readable storage medium of claim 9, wherein the identifier is stored on the client device in the form of a cookie.

11. The at least one computer-readable storage medium of claim 9, wherein the instructions, when executed by the client device, further enable the client device to:
accept, as input, from the mobile device, the token; and
transmit the token to the server.

12. The at least one computer-readable storage medium of claim 11, wherein the instructions, when executed by the client device, further enable the client device to accept, as input, from the mobile device, the token via a near field communication transceiver of the client device.

13. The at least one computer-readable storage medium of claim 9, wherein the instructions, when executed by the client device, further enable the client device to render the barcode on the display of the client device via a secure channel to the display, on the client device.

14. The at least one computer-readable storage medium of claim 13, wherein the secure channel comprises a protected audio video path (PAVP).

15. The at least one computer-readable storage medium of claim 9, wherein the online resource is a secure data channel between the server and the client device, and the token transmitted in the barcode is a cryptographic key to be utilized by the client device to encrypt data transmitted to the server and decrypt data received from the server via the secure data channel.

16. The at least one computer-readable storage medium of claim 15, wherein the cryptographic key is a Diffie-Hellman key.

17. At least one non-transitory computer-readable storage medium comprising instructions, which, in response to execution by a server, cause the server to:
receive from a client device, a request to access an online resource;
select a barcode encoding algorithm associated with the online resource from a plurality of barcode encoding algorithms;
generate, in response to the request, a barcode containing a token, wherein generate the token includes:
encoding an identity of the online resource in the barcode;
encoding the token in the barcode using the selected barcode encoding algorithm to encode the token in a manner specific to a mobile device, separate from the client device, to be used to decode the barcode to identify the online resource and recover the token; and transmit the barcode to the client device, wherein the barcode is to be displayed on the client device to enable the token to be extracted by the mobile device from an image captured with a camera of the mobile device, and utilized to authenticate a user of the client device to the server, to enable the server to grant the requested access to the online resource by the client device.

18. The at least one computer-readable storage medium of claim 17, wherein the instructions, in response to execution by the server, further cause the server to:

receive from the client device, a response;

determine whether the response comprises the token; and grant or deny the requested access based at least in part on a result of the determination.

19. The at least one computer-readable storage medium of claim 17, wherein the instructions to generate the barcode containing a token further cause the server, upon execution by the server, to encode, in a manner specific to both the mobile device and the requested online resource, the barcode with a token.

20. The at least one computer-readable storage medium of claim 19, wherein the request further includes an identifier of the mobile device and a format specific to both the mobile device and the requested online resource is based, at least in part, upon the identifier.

21. The at least one computer-readable storage medium of claim 17, wherein the instructions, when executed by the server, further cause the server to:

generate a login page to access the requested online resource, containing, at least, the barcode; wherein to transmit the barcode to the client device further includes transmission of the login page to the client device in a format capable of being displayed to a user.

22. The at least one computer-readable storage medium of claim 17, wherein the barcode is a matrix barcode.

23. The at least one computer-readable storage medium of claim 22, wherein the matrix barcode is a QR code.

24. The at least one computer-readable storage medium of claim 17, wherein the requested online resource is an online application.

25. The at least one computer-readable storage medium of claim 17, wherein the token is a one-time password (OTP).

* * * * *